United States Patent
Berchowitz

(10) Patent No.: US 11,976,864 B2
(45) Date of Patent: May 7, 2024

(54) DYNAMIC FREQUENCY TUNING FOR DRIVING A FREE-PISTON GAMMA-TYPE STIRLING HEAT-PUMP AT MINIMUM ELECTRICAL POWER INPUT OR MAXIMUM THERMAL COOLING POWER DEPENDING UPON CURRENT THERMAL CONDITIONS

(71) Applicant: Global Cooling, Inc., Athens, OH (US)

(72) Inventor: David M. Berchowitz, Athens, OH (US)

(73) Assignee: GLOBAL COOLING, INC., Athens, OH (US)

( * ) Notice: Subject to any disclaimer, the term of this patent is extended or adjusted under 35 U.S.C. 154(b) by 266 days.

(21) Appl. No.: 17/236,701

(22) Filed: Apr. 21, 2021

(65) Prior Publication Data

US 2022/0341634 A1  Oct. 27, 2022

(51) Int. Cl.
*F25B 9/14* (2006.01)

(52) U.S. Cl.
CPC ........ *F25B 9/14* (2013.01); *F25B 2309/1428* (2013.01)

(58) Field of Classification Search
CPC .............................. F25B 9/14; F25B 2309/142
See application file for complete search history.

(56) References Cited

U.S. PATENT DOCUMENTS

| | | | |
|---|---|---|---|
| 5,412,951 A | 5/1995 | Wu | |
| 7,171,811 B1 | 2/2007 | Berchowitz et al. | |
| 2007/0256428 A1* | 11/2007 | Unger | H02K 11/33 62/295 |
| 2011/0005220 A1 | 1/2011 | Berchowitz | |
| 2013/0042607 A1 | 2/2013 | Berchowitz | |

(Continued)

FOREIGN PATENT DOCUMENTS

| | | |
|---|---|---|
| JP | H07260277 A | 10/1995 |
| JP | 2001304745 A | 10/2001 |
| JP | 2004108678 A | 4/2004 |

(Continued)

OTHER PUBLICATIONS

Sakai, Freezer, 2003, Full document (Year: 2003).*

*Primary Examiner* — Nael N Babaa
(74) *Attorney, Agent, or Firm* — Brown & Michaels, PC

(57) ABSTRACT

In a gamma free-piston Stirling cooler driven by linear electric motors, a motor operating frequency for consuming minimum electric power is detected and a different motor operating frequency that delivers maximum thermal cooling power is detected. The frequencies are detected by varying the operating frequency in small steps while sensing (1) the motor power input to maintain a steady temperature or (2) the thermal cooling power of the Stirling cooler. A mode detection routine detects whether the appropriate freezer operation is the electric power minimization mode or the thermal cooling power maximization mode based upon the current thermal conditions in the freezer. When the freezer is sufficiently cold, the pistons of the Stirling cooler are driven at the minimum electric power consumption frequency. When the temperature is, or is likely to become, too warm, the pistons of the Stirling cooler are driven at the maximum thermal cooling power frequency.

30 Claims, 6 Drawing Sheets

(56) References Cited

U.S. PATENT DOCUMENTS

2019/0203660 A1     7/2019   Hesselink et al.

FOREIGN PATENT DOCUMENTS

| | | | |
|---|---|---|---|
| JP | 2005003318 A | * | 1/2005 |
| JP | 2005003318 A | | 1/2005 |
| JP | 2007077985 A | | 3/2007 |
| JP | 2012533018 A | | 12/2012 |
| JP | 2014525534 A | | 9/2014 |

* cited by examiner

DYNAMIC FREQUENCY TUNING FOR DRIVING A FREE-PISTON GAMMA-TYPE STIRLING HEAT-PUMP AT MINIMUM ELECTRICAL POWER INPUT OR MAXIMUM THERMAL COOLING POWER DEPENDING UPON CURRENT THERMAL CONDITIONS

BACKGROUND OF THE INVENTION

This invention relates to methods and apparatus for operating a gamma free piston Stirling machine, in particular a gamma free piston Stirling cooler, such as used as a heat pump to cool an ultra-low temperature freezer. One purpose of the invention is to maximize the energy efficiency of the freezer by minimizing electrical power consumption when that mode is appropriate for the existing temperature conditions. A second purpose of the invention is to maximize the rate at which the freezer temperature can be decreased to its set point temperature by maximizing the thermal cooling power when that mode is needed because of existing temperature conditions.

Freezers that use Stirling cycle free piston coolers are not only the most environmentally sustainable ultra-low temperature (ULT) freezers, but they are also the best performing with the lowest cost of operation. ULT freezers typically maintain their storage chamber temperature in a temperature range between minus 80° C. and minus 90° C. These freezers are used by universities, hospitals and pharmaceutical manufacturers and distributors to store biologic samples, such as vaccines.

The simplest free piston Stirling cooler is a beta-type configuration that is commonly used in freezers. The principal and essential moving components of the beta configuration are a piston, a displacer, and a balancer. The piston and displacer reciprocate in cylinders and spring forces applied to the piston and displacer create a mechanically resonant system that is operated at or near its resonant frequency. The reciprocation of the piston causes vibration of the casing that contains the beta free piston Stirling cooler. The purpose of the balancer is to remove excessive vibration from the casing to minimize noise transmission. A beta-type Stirling machine is optimally tuned by first adjusting the resonance frequency of the displacer until its motions have a preferred displacement phase lead ahead of the piston. Once that is achieved, the balancer must be tuned. Since the balancer is typically an un-damped sprung mass, it has a high Q (stored energy/dissipated energy) resulting in a requirement for very precise tuning in order to obtain optimum performance. This tuning is often within a fraction of a Hertz of the desired natural frequency of oscillation which can be quite difficult to achieve in a practical manner. Current practice is to tune the balancer by adding or subtracting mass until the casing vibration is less than a maximum allowable level. A method that might suggest itself is to change the operating frequency of the machine until minimum casing vibration was achieved. The problem with this method is that it would alter the displacer motion phase relationship to the piston motion and reduce the performance of the machine at the point of minimum casing vibration. Consequently, it would be desirable to eliminate the need for tuning and also avoid the need for a balancer and yet still have an acceptably small level of vibration.

FIG. 1 is a relatively simplified diagrammatic illustration that includes a gamma free piston Stirling cooler mounted to refrigerate the storage chamber of a freezer. Freezers of this configuration are known in the prior art and the basic components as shown in FIG. 1 are also applicable to embodiments of the invention. Free piston Stirling machines, also referred to as free piston Stirling engines, are well known in the prior art including those of the gamma configuration. They can be operated as a motor by applying heat to one component of the machine for producing a reciprocating output for driving a mechanical load. They can also be driven by a reciprocating driver, such as a linear electric motor, to transfer heat from a "cold head" to a warmer mass such as the ambient atmosphere. In the latter function they are also known as heat pumps. The term "Stirling cooler" is used to refer to a Stirling machine that is designed and intended to pump or lift heat from its cold head to a higher temperature mass.

Because Stirling coolers and freezers that use Stirling coolers are well known in the prior art, this description is a summary. Referring to FIG. 1, a gamma free piston Stirling cooler 10 is mounted in a refrigeration apparatus, such as a freezer 12, having a storage chamber 14, and configured for lifting heat from the storage chamber 14 through its cold head 15 to the ambient atmosphere. The storage chamber 14 has an access door 17 for insertion and withdrawal of samples that are stored in the storage chamber 14. The Stirling cooler 10 has a displacer 16 and two pistons 18 and 20. The pistons 18 and 20 are in an opposed arrangement which ideally cancels all vibration due to pistons' opposite directions of motion. The displacer 16 is connected by a connecting rod 22 to a planar spring 24. The working gas that is sealed in the casing 26 also acts as a spring applying a spring force to the pistons so the entire cooler 10 is mechanically resonant. Although the displacer motions are not balanced, a displacer is of low mass so its contribution to casing vibrations is small and generally acceptable. The pistons are driven in opposed reciprocation by an AC linear electric motors 28 so forces that would otherwise cause the casing 26 to vibrate are mutually canceled. The motors 28 are driven at an operating frequency by an alternating electrical voltage and current supplied by an alternating electrical power source 30. The electrical power source 30 is controlled by an electronic control system 32 which includes digital processing circuits and computer components. Sensed operating parameters are supplied to the control system 32 by at least a storage chamber temperature sensor 34 and other sensors 36. A prior art control system controllably varies the voltage amplitude of the power source 30 according to its stored control algorithm and based upon its input sensed operating parameters.

FIG. 2 is a phasor diagram that illustrates the motions of the pistons 18 and 20 and the displacer 16 and shows the relative phase between those motions. The displacer 16 reciprocates in advance of the piston motions by about 45° to 65°. The pistons 18 and 20 operate in-phase with each other from a time viewpoint although they are opposed from a spatial viewpoint. Because the phasor diagram of FIG. 2 shows the time-domain relationship of the motions, the motions of the two piston 18 and 20 are shown over-lapping but in the same lagging phase relationship to the motions of the displacer 16. The motions of the casing 26 are in opposition to the motions of the displacer 16. Since the displacer 16 is of low mass and the rest of the entire machine is of considerably more mass, the resultant casing motion is small and in most practical cases, of negligible consequence.

Prior art Stirling coolers operate at a single, constant operating frequency at or near the mechanical resonant frequency of the machine. The thermal cooling power delivered by the Stirling cooler for pumping heat is an increasing function of piston amplitude. Piston amplitude is an increasing function of the AC voltage applied to an AC linear electric motors 28. The prior art modulates thermal cooling power by modulating the voltage applied to the linear electric motors 28 for controlling the temperature in the storage chamber 14. Embodiments of the invention include a mode of operation that, at times, modulates the voltage applied to the linear electric motors 28 for controlling the temperature in the storage chamber 14. For that purpose a negative feedback control system 32 has inputs of sensed storage chamber temperature and a stored set point temperature. The control system 32 modulates thermal cooling power by modulating the voltage of the alternating electrical power source 30 in order to maintain the storage chamber 14 temperature within a range around the set point temperature according to well-known negative feedback control principles. For delivering maximum cooling power, the prior art operates the Stirling cooler at its limit of maximum amplitude at its single operating frequency.

In order for a free piston Stirling cooler to operate efficiently, the periodic reciprocation of the displacer should lead the periodic reciprocation of the pistons by an angle in the range of about 45° to 65°. The angle of the displacer lead is a function of the relationship of the operating frequency of the Stirling cooler to the mechanical resonant frequency (the peak of the resonant curve) of the Stirling cooler. Since the prior art Stirling coolers operate at a single operating frequency, in order for the displacer phase lead to be at an acceptable angle within the above range, the Stirling cooler must be tuned to a mechanical frequency that will allow it to operate at an acceptable phase lead when driven at the single operating frequency.

The mechanical resonant frequency of Stirling machines is a function of the mass of each of its reciprocating components and the effective spring constants of its mechanical springs and its working gas which behaves like a spring. Sometimes manufactured parts vary in mass or spring constant and the sensed displacer phase is not within a selected acceptable range. If the parts are not in the acceptable range, prior art manufacturers tune the displacer mechanically so it has an acceptable phase relationship to the pistons. The displacer is tuned for an optimum overall performance while observing its motions relative to the piston motions. Optimum performance means a phase lead which provides the least energy input to maintain a given cold temperature.

This process of tuning requires disassembly of the machine to add or subtract mass from the displacer and then reassembly to test its operation and sense the phase lead of its displacer. For each freezer being manufactured, this procedure may be repeated multiple times until a phase angle is detected that is within an acceptable range. Therefore this procedure is obviously rather labor intensive. The cost and difficulty of this procedure not only add to the cost of the freezer but also require that a phase lead must be accepted that is acceptably close to, but still different from, phase lead angles that would be optimum for different modes of cooler operation. An operating condition must be accepted that is a compromise between the optimum energy efficiency that could be attained and the maximum thermal cooling power that could be attained for a particular Stirling cooler. For example, a phase lead between 50° C. and 60° C. may be regarded as a reasonable compromise. After tuning the Stirling cooler to obtain a displacer phase lead anywhere within that range, the Stirling cooler of the prior art is then driven and operated only at its single standard operating frequency for the rest of its useful life.

It would be desirable, however, to simultaneously accomplish three improvements: (1) eliminate excessive vibration and the need for a balancer; (2) reduce manufacturing costs by eliminating the need to tune the Stirling machine in the manner previously described; and (3) operate a Stirling cooler in either of two different and optimized modes of operation, one mode for maximum energy efficiency and another mode for maximum thermal cooling power instead of accepting and operating the Stirling cooler in a mode based on a compromise.

BRIEF SUMMARY OF THE INVENTION

The invention cools a ULT freezer with a gamma free-piston Stirling cooler and drives its linear electric motors, which reciprocate its pistons, with an AC power source that has a controllably variable frequency. An optimum frequency detection method detects a motor operating frequency at which the electric power consumption of the electric motor is minimized while the Stirling cooler maintains a fixed thermal load. An optimum frequency detection method also detects a different motor operating frequency at which the Stirling cooler's output thermal cooling power in maximized. The optimum frequencies are detected by applying an optimizing algorithm that changes the operating frequency in small steps while sensing for each step (1) the power input required to maintain a steady temperature in the freezer or (2) sensing the thermal cooling power provided by the Stirling cooler to lower the temperature in the freezer.

The invention also has a mode detection routine for detecting whether the appropriate freezer operation is the electric power minimization mode or the thermal cooling power maximization mode. That detection is based upon the current thermal conditions in the freezer. When the storage chamber of the freezer is sufficiently cold so that steady state operation is appropriate, the pistons of the Stirling cooler are driven at a detected steady state minimum electric power consumption frequency for conserving electrical power. When the storage chamber of the freezer is, or is likely to become, too warm, the pistons of the Stirling cooler are driven at the detected, and lower, maximum thermal cooling power frequency to minimize the time for the freezer to cool down to its set point temperature.

The invention results in at least the following improvements: (1) the steady-state power consumption, which can be considerable, is minimized; (2) the temperature recovery rate after a door opening or other substantial heat input is minimized; and (3) the manufacturer is no longer required to tune each Stirling cooler machine individually in expensive and time-consuming operations.

Figure 1:
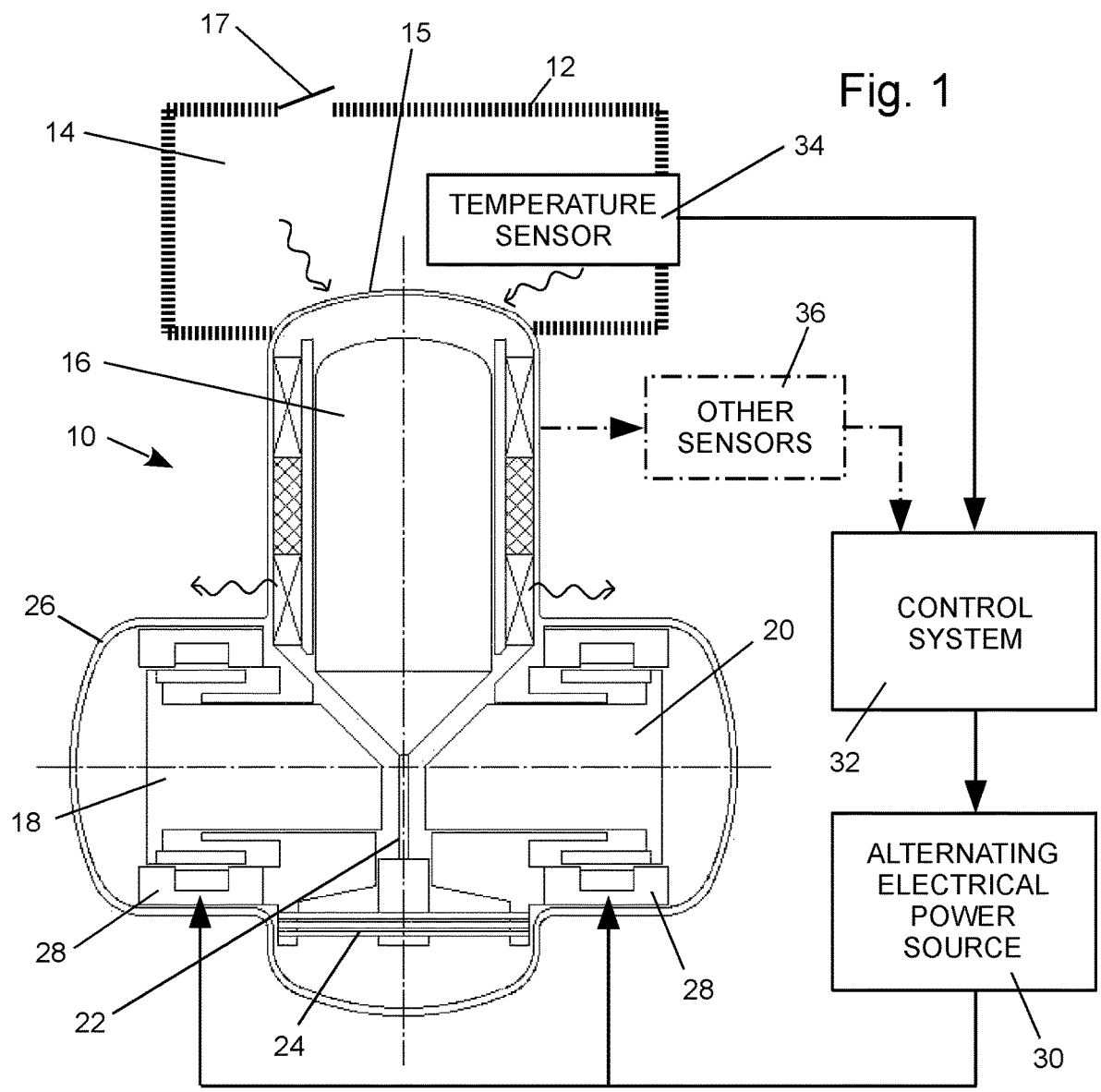
FIG. 1 is a schematic and diagrammatic illustration of a freezer that is cooled by a gamma free-piston Stirling cooler.
Figure 2:
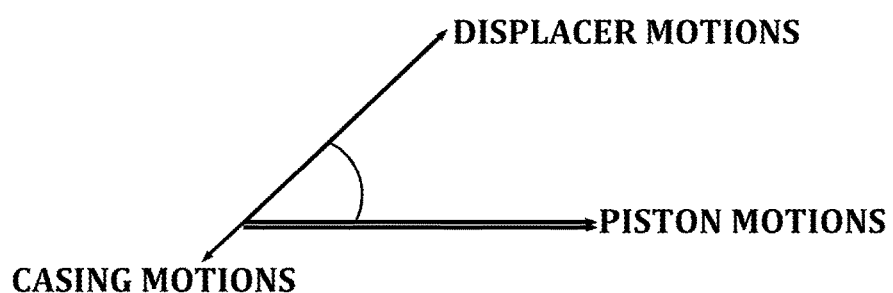
FIG. 2 is a phasor diagram illustrating the piston and displacer phase relationship and motions in a prior art gamma Stirling engine.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Overview

The invention eliminates the need for mechanically tuning a Stirling cooler during its manufacture. Such tuning has been done in the prior art so that the Stirling cooler can be operated at a single operating frequency by tuning it for a compromise mode of operation. Operating the cooler at a single frequency was necessary with a beta Stirling cooler because it requires a vibration balancer which is a resonant device with a high Q (very sharp resonant peak) so it must be driven very near its resonant frequency for acceptable performance. Because a gamma Stirling cooler does not require a vibration balancer, the criticality of its operating frequency is substantially reduced. The gamma Stirling cooler allows some variation in the drive frequency applied to the electric motor. The use of a gamma Stirling cooler permits the cooler's electric motors to be driven with a variable frequency, alternating current (AC), power source at either a frequency at which the electric power input to the electric motors is minimized or at a relatively lower frequency at which the thermal cooling power of the Stirling cooler is maximized. A variable frequency, AC power source, sometimes referred to as a variable frequency drive (VFD), is essentially an oscillator circuit with an electronically variable frequency and can deliver sufficient power to drive an electric motor. Such power sources are commercially available for driving rotating electric motors.

Figure 4:
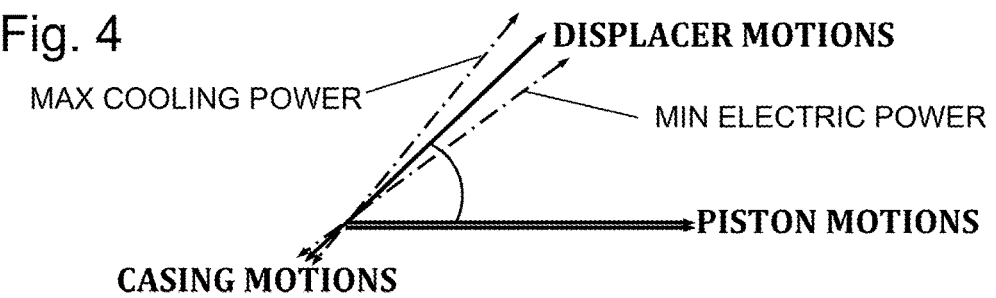
FIG. 4 is a phasor diagram similar to FIG. 2 but illustrating the piston and displacer phase relationship and motions in a gamma free-piston Stirling cooler operated according to the invention.

With the frequency being less critical because of the elimination of the vibration balancer, the operation of the invention is based on the observation that the Stirling cooler (1) operates at minimum power input when driven at a slightly higher operating frequency above the prior art frequency that is a compromise between input power efficiency and cooling power and (2) operates at maximum thermal power when driven at a lower operating frequency slightly lower than the prior art frequency. The reason is that changing the frequency changes the phase lead of the displacer ahead of the pistons. Changing the phase lead of the displacer changes the input electrical power and the thermal cooling power of the gamma Stirling cooler. The operating frequency and displacer phase lead are different for minimum electrical power input than for maximum thermal cooling power. FIG. 4 is a phasor diagram that shows an example of the phase relationships. The invention finds and then operates the Stirling cooler at the minimum electrical power input or the maximum thermal cooling power depending upon thermal conditions in the freezer.

Figure 5:
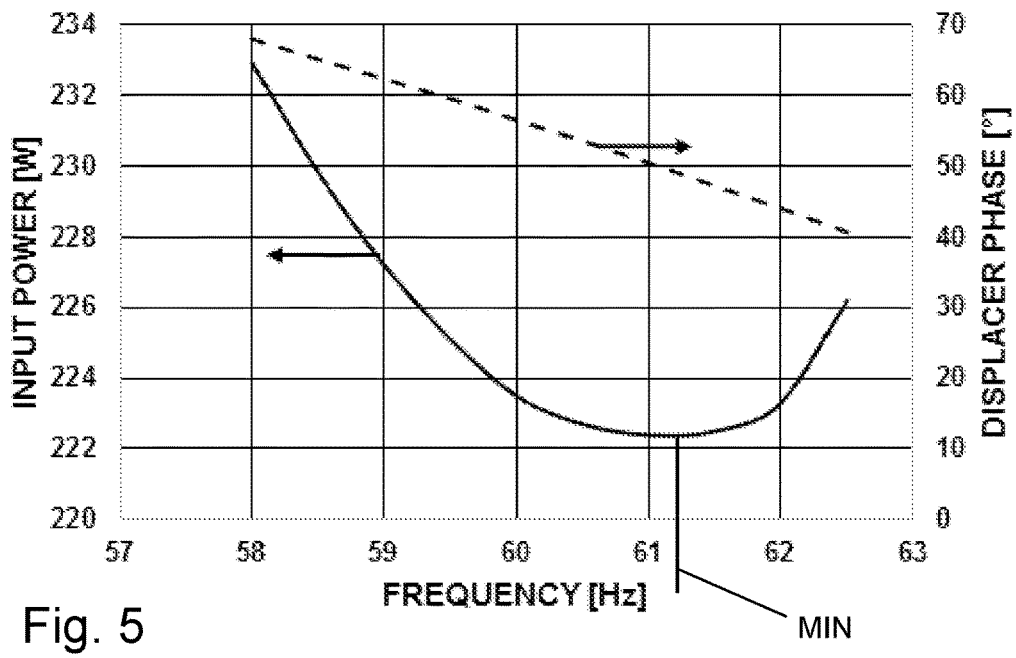
FIG. 5 is a graph illustrating the variation of the electric power input to the electric motors, which are driving a Stirling cooler operating according to the invention, as a function of the motor drive frequency.
Figure 6:
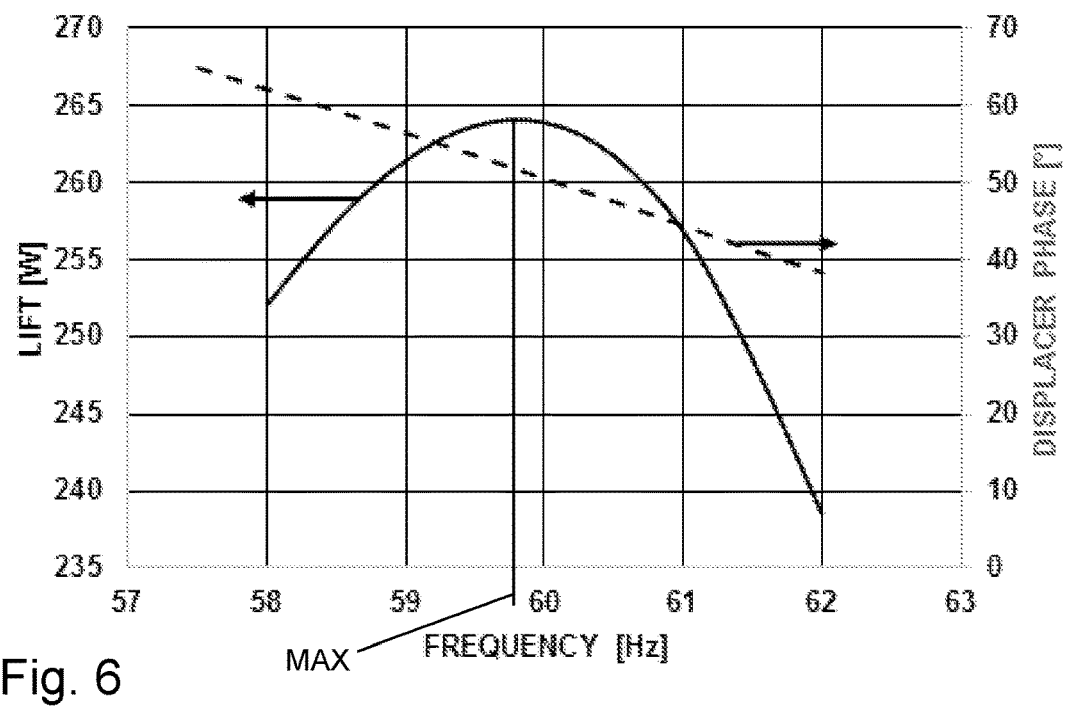
FIG. 6 is a graph illustrating the variation of the thermal cooling power ("lift") from a gamma free-piston Stirling cooler, which is being driven by electric motors according to the invention, as a function of the motor drive frequency.

FIGS. 5 and 6 are graphs illustrating the application of the principles of the invention to a gamma free piston Stirling cooler that is driven according to the invention. FIG. 5 illustrates an example of the input electrical power and the displacer phase lead as a function of frequency. It also shows minimum input power at an operating frequency of approximately 61.2 Hz. FIG. 6 illustrates an example of the thermal cooling power and the displacer phase lead as a function of frequency. It also shows maximum thermal cooling power at an operating frequency of approximately 59.8 Hz. Although not relevant to the invention or to an understanding of the invention, the phase vs. frequency graphs would be the same in FIGS. 5 and 6 if they were obtained under identical conditions. The conditions include piston amplitude, cold head temperature and the temperature of the heat exchanger to the ambient atmosphere. FIG. 5 was obtained at a thermal cooling power of around 90 Watts which is close to the steady state thermal cooling power of a commercial freezer at −80° C. FIG. 6 was obtained for a commercial freezer under conditions close to maximum thermal cooling power with the freezer near −80° C. However, the optimum sampled frequency for maximum cooling power is a function of freezer temperature so that the optimum operating frequency changes as the freezer cools down. Similarly, the phase v. frequency curve at close to maximum piston amplitude would be different at different temperatures. But the invention repeatedly adapts the optimum frequency for maximum thermal cooling power to different freezer temperatures and different set point temperatures by repeatedly detecting the optimum frequency.

The invention provides an optimum frequency detection method for detecting an operating frequency at which a Stirling cooler can be operated in a steady state temperature maintenance mode. During the steady state mode, that is, when the thermal load becomes steady, the electrical power input to the cooler's electric motors is desirably at a minimum in order to provide maximum efficiency. The invention also provides an optimum frequency detection method for detecting an operating frequency at which a Stirling cooler can be operated in a recovery maximum thermal cooling power mode. During the recovery mode the Stirling cooler's thermal cooling power is desirably maximized in order to minimize the time required for its freezer to be cooled down to its set point temperature.

Both the method for finding the optimum steady state operating frequency that provides minimum power consumption and the method for finding the optimum recovery operating frequency that provides maximum thermal cooling power include a sensing or sampling routine that includes varying the frequency of the alternating electrical voltage and current power source 30 across a selected frequency range. For finding the optimum steady state mode operating frequency, the electrical power delivered into the electric motors is sensed at a plurality of drive frequencies within the frequency range while maintaining steady freezer temperature. Then the electric motor is driven at an operating frequency at which the smallest sensed electrical power input to the electric motors was sensed. For finding the optimum recovery mode operating frequency, the thermal cooling power delivered by the Stirling cooler is sensed at a plurality of drive frequencies within a selected frequency range and the electric motor is then driven at the operating frequency of the largest sensed thermal cooling power.

Preferably, the drive frequencies across the frequency ranges are closely spaced discrete sampled frequencies each providing an electrical power sample or thermal cooling power sample.

Both the method for finding the optimum steady state operating frequency and the method for finding the optimum recovery mode operating frequency can be performed during the manufacture of the freezer, during the operating life of a completed freezer or during both.

When detecting the optimum frequencies is performed during manufacture on the factory floor, the two detected optimum frequencies are stored in the controller memory. The control routines are programmed to operate the freezer at the stored frequency that is associated with a selected mode of operation. Because the optimum frequencies would depend on the set-point temperature (because the displacer resonance changes with expansion space temperature), a set of optimum frequencies would need to be detected over the range of set-point temperatures for which the freezer was designed to be operated. Stored optimum frequencies and their associated set-point temperatures, which represent a freezer temperature vs. optimum frequency curve, is stored in the control firmware from which the optimum frequency can be recovered that is appropriate for current operational set point temperature of the freezer.

The methods for detecting the optimum frequencies can also be performed dynamically during the day to day operation of the freezer in its normal use over its lifetime. Control routines that perform the methods for detecting the optimum frequencies are programmed into the controller's control routines and run continuously as clocked through the processor or run periodically.

Prior art mechanical tuning of the Stirling cooler in the manner described above is unnecessary and therefore can be avoided by detecting the optimum frequencies according to the methods of the invention, whether the methods are performed during manufacture or dynamically during use of the freezer. Prior art tuning was necessary because variations in the mechanical parameters of the Stirling cooler are the result of variations in the mechanical parts, such as piston mass and spring constants. Variations in the parts caused variations in the operating parameters of the Stirling cooler, such as its resonant frequency. Those variations in the operating parameters of the Stirling cooler mean that each Stirling cooler that is manufactured can have cooling properties that are significantly different when all are operated at the same single operating frequency. For example, the coolers can have very different efficiencies or coefficients of performance as well as significantly different thermal cooling powers at the one operating frequency. The methods of the invention compensate for those variations in the manufactured parts by detecting the optimum frequencies for each particular Stirling cooler. Each manufactured Stirling cooler then operates in the alternative at one or the other of its own two optimum frequencies. Often the set of optimum frequencies for each freezer differ from the optimum frequencies of other Stirling coolers that were manufactured in the same production line from component parts with the same nominal specifications.

The methods of the invention also include mode detection methods for sensing one or more operating parameters of the freezer and detecting from the sensed parameter(s) whether the Stirling cooler can be operated in the steady state minimum power consumption mode or should be operated in a recovery maximum thermal cooling power mode. If the currently preferable operating mode is different from the current operating mode, then the operating mode is switched by the controller to the preferable mode. Otherwise it is not. The optimum frequency for the steady state minimum power input mode is greater than the optimum frequency for the maximum thermal cooling power recovery mode. Therefore, switching from one mode to the other includes the step of either increasing or decreasing the AC frequency of the electric motor drive.

Figure 3:
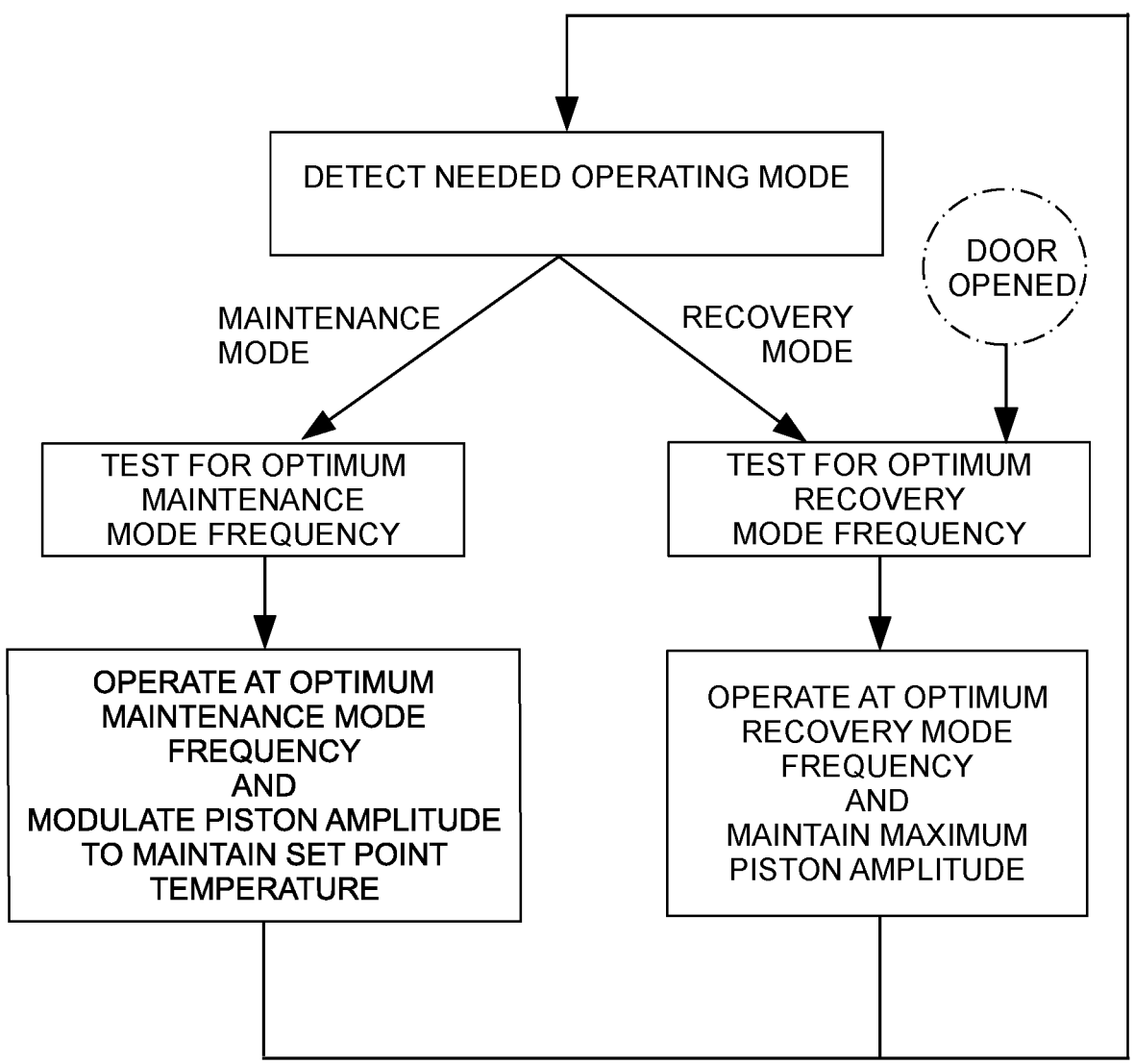
FIG. 3 is a flow diagram illustrating steps used in practicing the invention at a relatively highly simplified level.

FIG. 3 is a simplified flow chart illustrating the basic steps for practicing the invention in the day to day operation of a freezer using the freezer's Stirling cooler, electric motors, controller and temperature sensors. The immediately following description is an overview of the principal concepts of the invention and is followed by a more detailed explanation.

A first step is a mode detection routine that detects the operating mode in which the Stirling cooler should be operated as an appropriate response to sensed thermal conditions of the freezer. The two modes that are associated with the invention are a steady state, temperature maintenance mode and a maximum thermal cooling power recovery mode. In general terms, the steady state, temperature maintenance mode is appropriate if the freezer temperature is within a selected temperature range that extends above and below the set point temperature and there is no other sensed event or data that indicates or predicts a significant warming of the freezer storage chamber. Also in general terms, the maximum thermal cooling power mode is appropriate if the freezer temperature is warmer than a selected temperature or data is sensed that predicts a significant warming of the freezer storage chamber. For example, the opening of the storage chamber door 17, or its opening for at least a time period such as two minutes, is a thermal condition event because it predicts a significant warming of the freezer by an inrush of warm ambient air and can be used to initiate the maximum thermal cooling power recovery mode.

After the process detects the appropriate operating mode, the optimum frequency for the detected mode is found in the manner briefly described above and subsequently discussed in more detail. The optimum frequency is found by incrementally sweeping the frequency of the alternating electrical power source 30 across a selected frequency range. At multiple sensing frequencies within the frequency range, the electrical power absorbed by the electric motor is sensed to find the optimum steady state frequency. Similarly, at frequencies within the selected frequency range, the thermal cooling power supplied by the Stirling cooler is sensed for finding the optimum recovery mode frequency. After the optimum frequency is found, the electric motor is driven at the optimum frequency for the appropriate operating mode.

Sensing Power Input to the Electric Motor

Performing a method of the invention requires that the electrical power input to the electric motors 28, which drive pistons 18 and 20, be sensed at multiple drive frequencies in order to find the frequency that results in a minimum value of electrical power input at the steady-state temperature condition. The prior art gives numerous examples of circuits and techniques for measuring electrical power and providing an output representing the sensed value of power in analog or digital form. Because the motor terminals are accessible, a conventional power sensing circuit can be connected to those terminals. Such a circuit senses voltage, current and power factor and provides a digital or analog output to the controller 32.

Sensing Thermal Cooling Power

Performing a method of the invention also requires that the thermal cooling power applied by the Stirling cooler for transferring heat out of the freezer be sensed at multiple drive frequencies in order to find the frequency that results in a maximum value of thermal cooling power. Thermal cooling power is the heat energy transfer rate; that is, the time rate at which thermal energy is transferred out of the freezer storage cabinet and eventually away from the refrigeration apparatus by the gamma free piston Stirling cooler. It can be represented in various units such as Watts, calories per minute, BTU per hour (BTU/h), Joules per second, (1 Watt=1 Joule per second).

Because a method of the invention includes detecting a frequency at which the thermal cooling power is a maximum or minimum, it is not necessary to sense a value of the thermal cooling power that could be expressed in some particular conventional units. It is only necessary to sense the relative cooling power; that is, the cooling power at each sampled frequency relative to the cooling power at the other sampled frequencies. To do that, it is only necessary to sense a parameter that increases when thermal cooling power increases and decreases when thermal power decreases. In more mathematical terminology, it is only necessary to sense a parameter that is an increasing function of thermal cooling power. As used in this document, the step of sensing thermal cooling power includes sensing relative cooling power; that is, sensing a parameter that is an increasing function of thermal cooling power.

An example of a particular implementation of sensing thermal cooling power for purposes of the invention is sensing the time rate of temperature change in the freezer cabinet. The freezer's controller 32 is connected to a temperature sensor 34 and monitors storage chamber temperature for multiple purposes. Consequently, the controller can detect the time rate of temperature change by dividing the temperature difference between two sensed temperatures, which were sensed at different times, by the time interval between them. Alternatively or additionally, thermal cooling power can similarly be detected by sensing the temperature of components of the refrigeration circuitry, such as refrigerant-containing tubes that extend along the walls of the storage chamber and are thermally connected to the cold head 15.

An example of an implementation of sensing thermal cooling power of a Stirling cooler during the manufacturing process is to thermally connect the cold head 15 of the Stirling cooler to a heat load and measure the power consumed by the heat load in order to maintain a constant temperature. For example, an electrically powered resistance heater can be thermally coupled to the Stirling cooler's cold head. With that arrangement the electrical power supplied to the heater in order to maintain the cold head 15 at a constant temperature equals the thermal cooling power of the Stirling cooler. Therefore a direct measurement of the thermal cooling power can be made by measuring electrical power supplied to the heater.

Detecting the Appropriate Mode of Operation

Performing a method of the invention requires a mode detection routine in which the freezer's controller detects which mode of operation is appropriate for sensed thermal conditions of the freezer. The appropriate mode must be detected because embodiments of the invention do not operate at a single frequency based on a performance compromise but instead switch back and forth between two modes as dictated by thermal conditions of the freezer. There are two modes of operation.

The steady state mode is a temperature maintenance mode. It is the normal mode of operation for long term storage when the storage chamber has not been subjected excessive warming. For example, the steady state mode is appropriate if (1) the storage chamber is within a temperature tolerance range that includes a set point temperature OR (2) a warming rate of change of the storage chamber temperature is less than a temperature rate of change limit or both. In the steady state mode the applied motor voltage, and therefore the piston amplitudes, are modulated by the controller in the same manner as practiced in the prior art to maintain a set point temperature. In this steady state mode the full thermal cooling power of the Stirling cooler is not needed so it is desirable to operate the Stirling cooler at the frequency that provides the lowest power input commensurate with maintaining the steady state set point temperature. At that operating frequency the piston amplitude is modulated to maintain the set point temperature.

The recovery mode is appropriate when maximum cooling power is needed because the storage chamber has been or is about to be subjected to heat input that exceeds the normal heat input from the freezer's ambient environment through the insulated cabinet that surrounds the storage chamber. The recovery mode operates the Stirling cooler at its maximum thermal cooling power; that is, at its maximum capacity for transferring heat out of the storage chamber. The recovery mode is needed if operation in the steady state mode has failed, or is likely to fail, to maintain the temperature in the storage chamber below a selected temperature limit or set point. In the recovery mode it is desirable to operate the Stirling cooler at its maximum thermal cooling power in order to return the storage chamber temperature to the set point temperature as quickly as possible.

One way to detect which mode of operation is appropriate is to sense the internal temperature of the storage chamber and compare the sensed temperature to a stored temperature limit. The recovery mode should be initiated or continued if the sensed temperature is warmer than the stored temperature limit and the steady state mode can be initiated or continued if the sensed temperature is cooler than the stored temperature limit or set point. To accomplish the same thing, instead of using a stored temperature limit, a selected temperature differential between the set-point temperature and the sensed temperature can be stored and subsequently compared to a sensed temperature.

Another way to detect which mode of operation is appropriate is to sense the internal temperature of the storage chamber at spaced time intervals and compute the time rate of change of temperature. If the temperature is warming at a time rate of change that is more than a selected rate of change, then the recovery mode can be initiated. Sensing a sufficiently high rate of temperature increase could predict that operation in the steady state mode will be unable to maintain the set point temperature in the storage chamber.

Yet another way to detect whether the recovery mode is needed is to sense that the access door 17 to the storage chamber has been opened or has been opened for at least some selected minimum time interval. The access door is opened from time to time by users in order to store or retrieve samples from the storage chamber 14. If an access door is opened and remains open for two minutes, it can take a freezer nearly 1.5 hours to recover to its set point temperature. Initiating recovery mode operation by sensing that the access door was opened is optional and can override (be ORed with) the temperature sensing manner of detecting the need for the recovery mode.

Multiple ways of detecting the appropriate operating mode can be used and can be combined by control logic that includes combining them by AND and OR logical Boolean operations.

Detecting the Optimum Frequencies

As previously described, performing a method of the invention includes an optimum frequency detection routine for detecting operating frequencies at which a Stirling cooler can be operated in an optimum mode. One mode at one detected optimum operating frequency is a steady state, temperature maintenance mode. The other mode at a different detected optimum operating frequency is a recovery mode that provides maximum thermal cooling power. The processes for finding the two optimum frequencies are similar in many respects and perform many of the same sensing routine steps. Both processes include varying, across a selected frequency range, the frequency of the alternating electrical voltage and current power source that drives the Stirling cooler. Both processes include sensing, at a plurality of drive frequencies within the selected frequency range, the operating parameter that is to be optimized; namely, the power input to the electric motors or the thermal cooling power delivered by the Stirling cooler.

In describing the method of the invention in more detail, the sensed values that are sensed at each frequency are referred to as samples and the process of sensing them is referred to as sampling. The frequencies within the selected frequency range are referred to as the sampled frequencies. The operating frequency is the drive frequency applied to the electric motors by the AC power source 30 at a particular instant of time whether during a sampling routine or not. The term "nominal frequency" is also used. The nominal frequency of a cooler is an operating frequency that can be calculated during the design of the freezer as an approximate optimum operating frequency for the cooler if the cooler's parts had their designed nominal values, such as piston and displacer mass and spring constants of mechanical springs and working gas. Of course all manufactured parts depart from their nominal design values but are used so long as their actual values are within a design tolerance range. The nominal frequency may be used as a starting point in practicing processes or routines of the invention. The invention then compensates for departures from nominal values by detecting the actual optimum operating frequency. The "nominal frequency" is based on an assumed likely operating point, sometimes called the "design point". This design point necessarily assumes particular warm and cold side temperatures and piston amplitude. The nominal frequency is therefore a compromise. In Prior Art, the operating frequency is not changed and so the Stirling cooler operates in a compromised condition at off-design conditions. The invention compensates for operating conditions that are different from the design point.

Preferably, the sampled frequencies across the frequency ranges are spaced discrete frequencies. More specifically, an optimum frequency is found by varying the operating frequency of the electrical voltage and current applied to the electric motors in small discrete frequency increments to provide a plurality of sampled frequencies across the selected frequency range. At each of the sampled frequencies a sample of electrical power input or thermal cooling power is sensed and stored in the controller. Then, depending upon which mode is being optimized as a result of the mode detection routine or method, programmed routines in the controller detect and store the sampled frequency associated with the smallest sensed electrical power input to the electric motors or the sampled frequency associated with the largest sensed thermal cooling power sample.

FIG. 5 and FIG. 6 illustrate an example of a gamma Stirling cooler operated according to the invention. In FIG. 5 there is a minimum input electric power at an operating frequency of approximately 61.2 Hz. In FIG. 6 there is a maximum thermal cooling power at an operating frequency of approximately 59.8 Hz. Assuming that the nominal frequency is 60 Hz, the sampled frequency can be varied over a sampling range of ±2 Hz from the resonant frequency because that range will extend across the entirety of the maximum peak and the minimum inverted peak. That range includes both the frequency of minimum electric power and the frequency of maximum thermal cooling power. The discrete frequency increments between the sampled frequencies may, for example, be 0.2 Hz or, for some embodiments of the invention, 0.1 Hz or even 0.05 Hz. For example, for the embodiment illustrated in the figures, in order to find the frequency of the maximum thermal cooling power, the range over which samples can be taken (i.e. sensed) can be ±1 Hz from the resonant frequency because that includes the maximum. In summary, it is believed that sampling will be effective if conducted over a frequency range of no more than ±2 Hz and in frequency intervals of 0.01 Hz to 0.20 Hz.

Additionally, there will be a time interval between the times at which each sample is sensed. Two factors that should be considered in choosing the time between samples are the need for the Stirling cooler temperature to stabilize after a change in the sampled frequency and the need for the freezer temperature to exhibit a large enough temperature change that the thermal sensors will change their output signal to register a different temperature. Examples of temperature changes that can be sensed by commercially available temperature sensors are 0.2° C. and 0.05° C. A stabilization time that allows both the Stirling cooler's operation to stabilize and to stabilize at a temperature that is different enough from the previously sensed temperature will be the desired stabilization time. An estimate of a desirable stabilization time is 18 seconds although, for freezers of different sizes, an effective estimated stabilization time would be between 5 and 30 seconds.

It is desirable, although not necessary, to maintain the piston amplitude at a constant amplitude while sampling; that is while detecting the frequency at which the electric motor consumes a minimum electrical input power and while detecting the frequency at which the Stirling cooler provides its maximum thermal cooling power. Preferably, while performing the optimum frequency detection routine, the piston amplitude is maintained at the most recent amplitude at which the pistons were driven. The reason is that, during the sampling of the optimum frequency detection routine, the relationship between operating voltage and piston amplitude will change due to the changing differences between the resonant frequency of the pistons and the operating frequency. This changed relationship may result in the piston amplitude increasing or decreasing. These changes may distort the sensed parameters and result in inaccurate and misinterpreted data while performing the optimum frequency detection routine. If piston amplitude is not maintained, the method to obtain optimum displacer phase will still work but it can take longer to stabilize the operating point after each frequency change. Therefore, it will be beneficial to maintain the piston amplitude during the frequency changes made for practicing the optimum frequency detection routines. One method that can be used to maintain the piston amplitude is by using the technology disclosed in U.S. patent application Ser. No. 16/919,689 filed Jul. 2, 2020 by David M. Berchowitz and entitled Method For and Control System With Piston Amplitude Recovery for Free-Piston Machines.

Finding the Optimum at the Maximum and Minimum of the Curve

Because the sensed motor input power data and the sensed thermal cooling power data fall along a peak or inverted peak as illustrated in FIGS. 5 and 6 when plotted as a function of the sampled frequencies, the maximum and minimum of the peak can be found by the controller using optimizing algorithms that are known in the prior art. One simple manner of finding the minimum electric power input is, as the frequency progresses over the sampled frequency range, saving each sensed power sample in association with its sampled frequency only if it is less than a previously sensed sample. Consequently, after all samples have been sensed, the sample nearest the minimum of the peak will be saved. The same technique applies to finding the maximum thermal cooling power except that each sample of thermal cooling power is saved in association with its sampled frequency only if it is more than a previously sensed sample.

There are other algorithms that can be performed by the computer of the controller to find a maximum or minimum. Another example of a prior art algorithm is the Newton-Raphson technique which is a method for finding a root based on recognizing that a curve of a graph of a variable that has a maximum or minimum has a slope of zero at the maximum and minimum. The roots of the derivative of the curve of the graph would then be the maximum or minimum.

Instead of the sampling process of the optimum frequency detection routine progressing linearly across a range of sampled frequencies, routines can be used that sense the direction of change of the dependent variable (electric power input or thermal cooling power). The sampled frequency (independent variable) is then changed in a direction toward a maximum or minimum of the dependent variable. If the optimum frequency detection routine is searching for the minimum input electric power, the sampled frequency is changed after each sample in a direction that results in a reduced electric power input. If the optimum frequency detection routine is searching for the maximum thermal cooling power, the sampled frequency is changed after each sample in a direction that results in an increased thermal cooling power. By following the direction of increase or decrease, when the frequency is detected at which the increase is the same in opposite directions of frequency change, that is the frequency of the maximum or minimum.

After the sampling is completed and the frequency at the minimum or maximum is found, the electric motors are driven at the operating frequency of the maximum or minimum. More specifically, if the mode detection routine detects that the Stirling cooler can be operated in the steady state mode, the electric motors are driven at the frequency at which the smallest sensed electrical power input to the electric motor was sensed during the optimum frequency detection routine. If the mode detection routine detects that the Stirling cooler should be operated in the recovery mode, the electric motors are driven at the frequency at which the largest sensed thermal cooling power was sensed during the optimum frequency detection routine.

After the controller changes the operating mode, the optimum frequency detection routine continues to be repeated so the optimum frequency for the currently existing operating mode can be updated. Consequently, the freezer continues to operate at its optimum frequency for the current operating mode. The mode detection routine also continues to be repeated until it detects that the operating mode should be changed. Upon detecting the need for a change, the controller changes the operating mode and the process continues and repeats.

Figure 7:
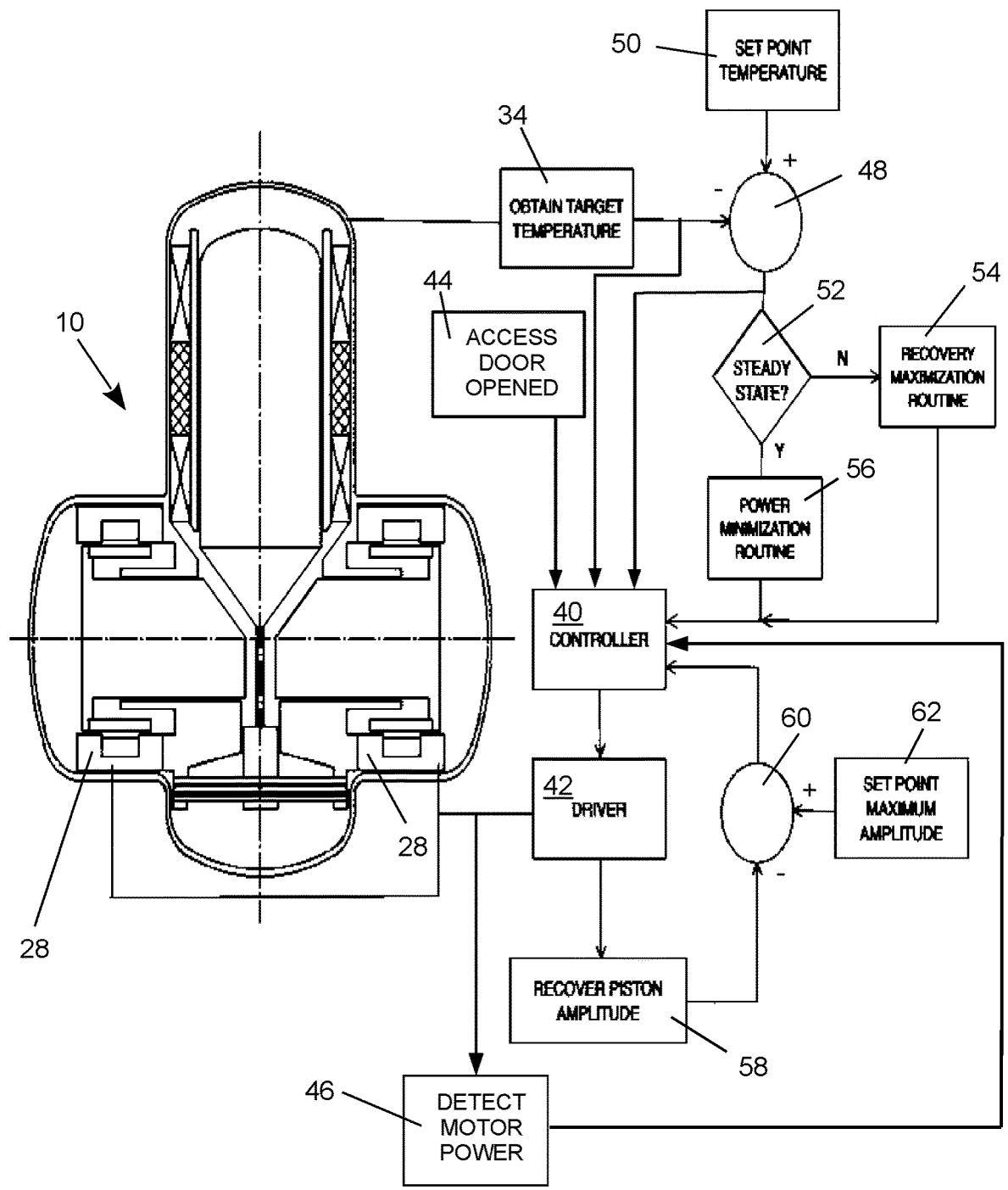
FIG. 7 is a block diagram illustrating an example of an apparatus embodying the invention and its operation.

FIG. 7—Example of System

FIG. 7 illustrates an example of an apparatus embodying the invention. The gamma Stirling cooler 10 is controlled by a controller 40 that includes a computer for processing sensed data and for running data processing routines that execute the methods of the invention as well as prior art methods that are also used to control the Stirling cooler 10. The controller 40 controls the driver 42 which is a source of alternating electrical voltage and current providing sufficient power, voltage and current for driving the electric motors 28. Both the frequency and the amplitude of the output voltage of the driver 42 are controllably variable by the output of the controller 40.

The controller 40 receives multiple inputs that are used for controlling the electric motors 28. One of its inputs is from an access door sensor 44 that senses the opening of the access door 17 (FIG. 1) for the purpose previously described. Another of its inputs is a motor electric power sensor 46 for the purpose previously described. A freezer temperature sensor 34 applies its temperature data to the controller 40 for the purposes previously described.

The temperature from the temperature sensor 34 is also applied to a summing junction 48. The other input to the summing junction 48 is the set point temperature input 50. The output of the summing junction 48 is the difference between the set point temperature and the sensed temperature in the freezer's storage chamber 14 (FIG. 1). That temperature difference is applied to the controller for controlling the piston amplitude in the steady state mode according to prior art feedback control principles as previously described. The temperature difference from the summing junction 48 is also applied to a mode detection routine symbolized by the decision block 52. The mode detection routine 52 initiates an optimum frequency detection routine which, depending on the mode that is detected, is either the previously described recovery mode thermal cooling power maximization routine 54 or the previously described electric motor power minimization routine 56. Data representing the detected optimum frequency for either motor power minimization or thermal cooling power maximization is transmitted to the controller 40.

A piston amplitude sensor 58, or an equivalent programmed piston amplitude sensing routine, applies the sensed piston amplitude to a summing junction 60. A set-point maximum allowable piston amplitude is summed with the sensed piston amplitude and the difference is applied to the controller 40. The purpose, as also known in the prior art, is to prevent the piston amplitude from exceeding a selected maximum amplitude beyond which collision damage to the Stirling cooler would occur. The piston amplitude output from the piston amplitude sensor 58 may also be applied to the controller 40.

Operation

If the two optimum frequencies for the two modes of operation were detected during the manufacture of the freezer, stored in the controller and not subsequently detected, the operation of the freezer is relatively simple. In that event the mode detection routine is continuously repeated and, when a change of mode is detected, the controller switches the operating frequency to the stored operating frequency for the mode to which operation should be switched.

However, in a more advanced implementation of the invention, both the mode detection routine and the optimum frequency detection routine are repeated throughout the life of the freezer. Those routines, along with the many other routines for controlling the freezer, are performed in a closed loop which is repeated in the usual manner. In describing the part of the control routines that are applicable to the invention we may begin by considering entry into the closed loop when a freezer is initially delivered and in a warmed state.

With the freezer in a warm state, operation may begin at a nominal frequency determined from the designed nominal parameters of the Stirling cooler, such as piston and displacer mass and the spring constants of the planar spring and the working gas. Alternatively, the freezer can be tested during manufacture to find the optimum frequency for the recovery maximum cooling power mode and operation initiated at that frequency.

With the freezer at a warm temperature and operating at the initial frequency of operation, the mode detection routine will detect that the recovery mode is needed. Consequently, the sampling process for finding the frequency of maximum thermal cooling power is run to find an optimum frequency for the recovery mode. Freezer operation is then changed to the most recently detected optimum recovery mode frequency. The cooling of the freezer to its set point temperature can take several hours, for example six hours. During that time the mode detection routine will be continuously repeated followed by the optimum frequency detection routine for finding the optimum frequency for maximum thermal cooling power. Each time a different frequency is detected, the operating frequency is changed to it. That repetition continues until the freezer reaches, or is within a selected temperature near, the set point temperature. It is expected that the optimum operating frequency for maximum thermal cooling power will change many times during that repetitive process as the freezer cools down.

The preceding repetition continues until the mode detection routine, based on temperature in the freezer, detects that the controller should change operation to the steady state mode. The change may be made when the mode detecting routine detects that the freezer has reached the set point temperature or is within some range of it such as within 5° C. of the set point temperature.

When operation is changed to the steady state minimum power mode, the sampling routine for finding the steady state minimum input electric power is initiated. The mode detection routine and the sampling routine for finding the steady state minimum input electric power are then continuously repeated. Whenever that sampling routine detects a different optimum frequency, the operating frequency is changed to the most currently detected optimum operating frequency and the routine repetition is continued.

The immediately preceding repetition of the mode detection routine and the optimum frequency detection routine continues until the mode detection routine, based on temperature in the freezer or the rate of change of that temperature or the freezer door is opened, detects that the controller should change operation to the recovery mode.

The controller then changes to the recovery mode and operation returns to repeated sampling to obtain the optimum frequency for maximum thermal cooling power and running the mode detection routine as described above. Upon initial entry into the recovery mode, the frequency is initially changed to the most recently detected optimum recovery mode frequency.

Figure 8:
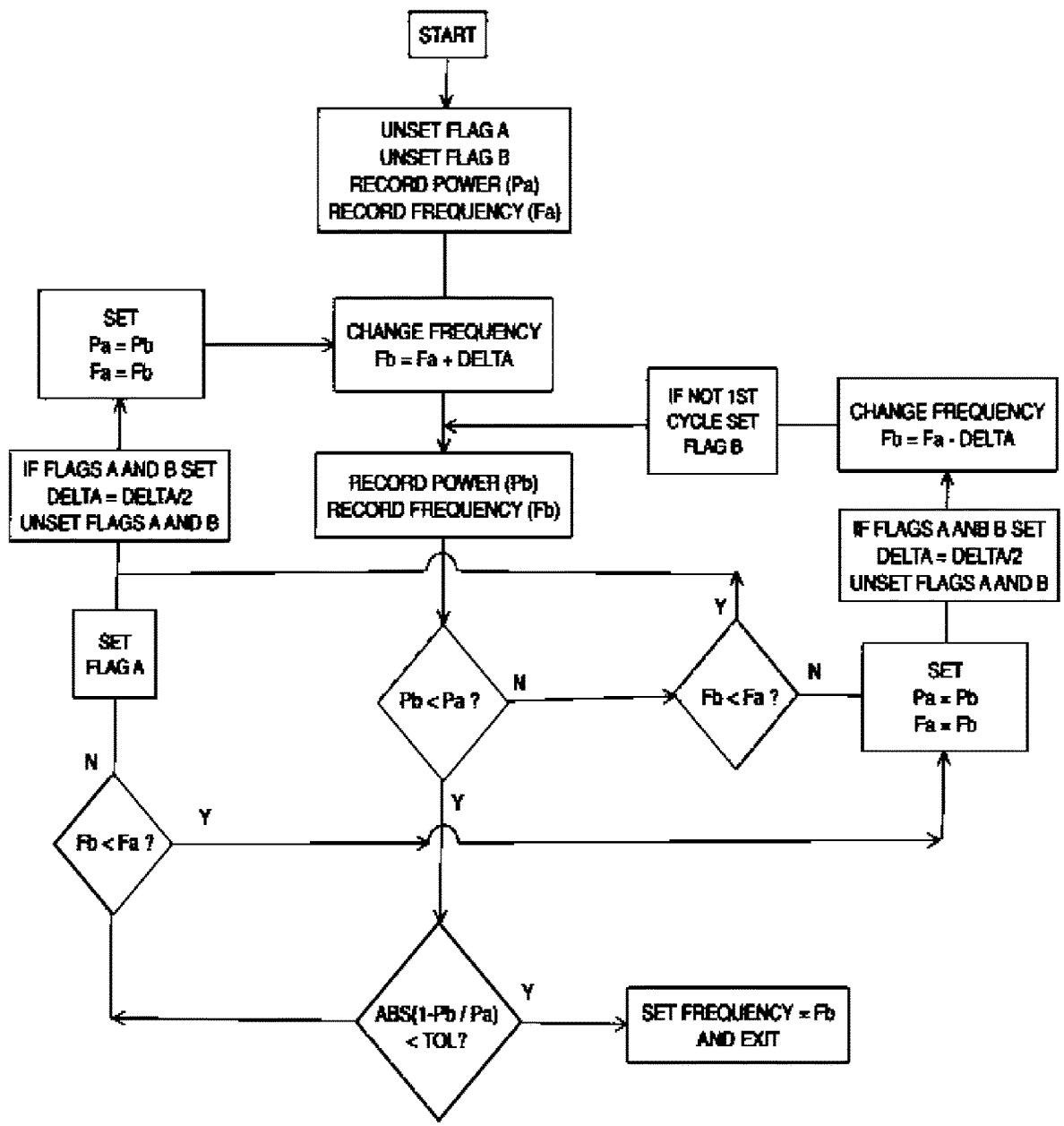
FIG. 8 is a flow chart illustrating an implementation of a routine for finding the optimum frequency for the steady state minimum motor input power mode of operation according to the invention.
Figure 9:
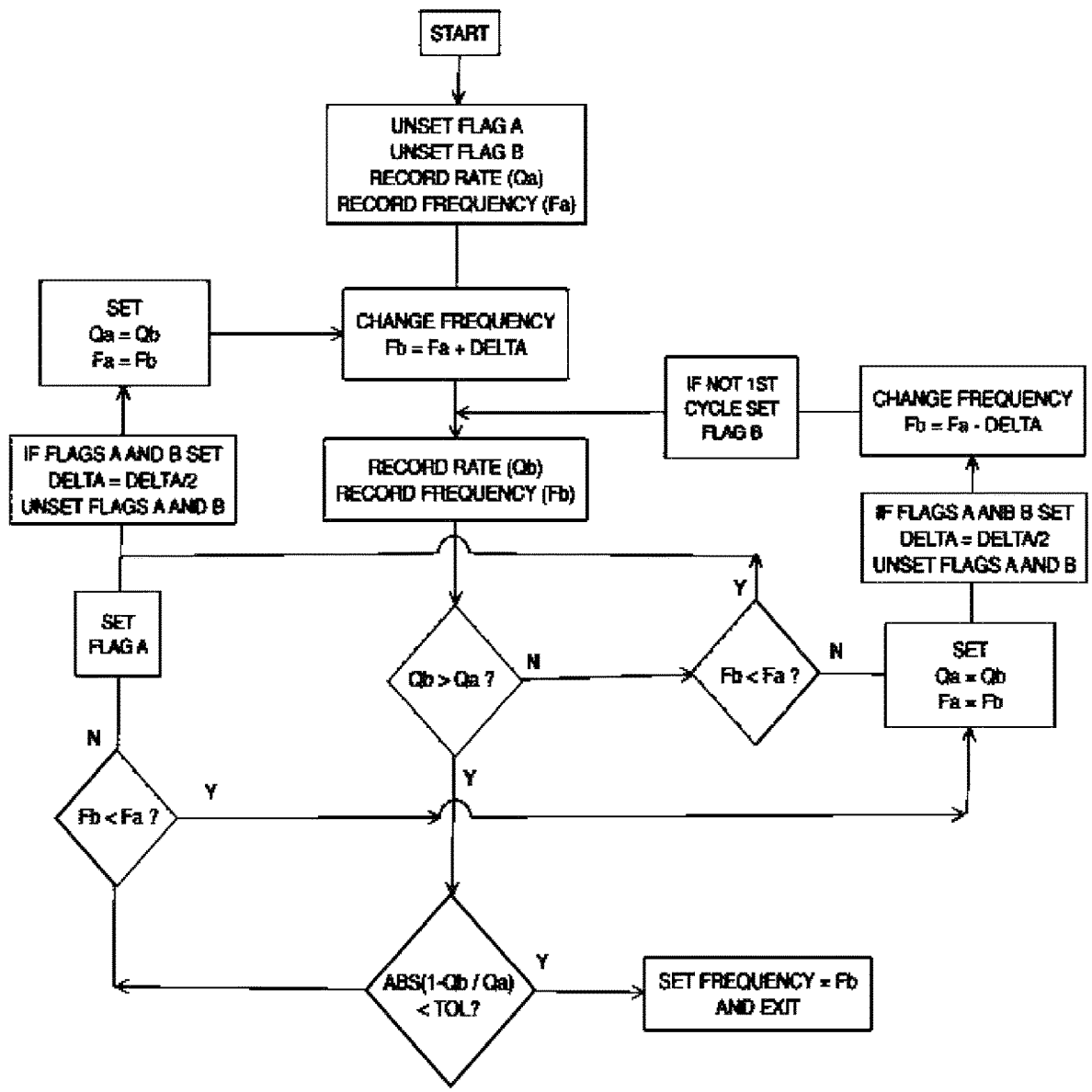
FIG. 9 is a flow chart illustrating an implementation of a routine for finding the optimum frequency for the maximum thermal cooling power mode of operation according to the invention.

FIGS. 8 and 9 are flow charts illustrating examples of more detailed implementations of the routines for finding the optimum frequencies for the steady state minimum motor input power mode (FIG. 8) and for finding the optimum maximum thermal cooling power mode (FIG. 9).

TABLE OF REFERENCE NUMBERS

10 gamma free piston Stirling cooler
12 freezer
14 storage chamber
15 cold head
16 displacer
17 access door
18 and 20 pistons
22 connecting rod
24 planar spring
26 casing
28 linear electric motors
30 alternating electrical power source
32 electronic control system
34 storage chamber temperature sensor
36 other sensors.
40 controller
42 electric motor driver
44 access door sensor
46 motor power sensor
48 summing junction for freezer temperature/set-point
50 freezer temperature set-point
52 decision block
54 recovery mode maximization routine
56 electric motor power minimization routine
58 piston amplitude sensing
60 summing junction for piston amplitude limiting
62 maximum piston amplitude set-point This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method for controllably varying input electrical power of a gamma free piston Stirling cooler having a displacer and at least two pistons and is driven in reciprocation by linear electric motors, the motors being driven by an alternating electrical voltage and current at an operating frequency, the method comprising:
   (a) driving the linear electric motors by an alternating electrical voltage and current that has a controllably variable drive frequency; and
   (b) decreasing input electrical power to the linear electric motors to operate in a temperature maintenance mode by increasing the operating frequency of the alternating electrical voltage and current to thereby decrease the displacer's phase lead ahead of the pistons; or
   (c) increasing the thermal cooling power of the Stirling cooler to operate in a recovery mode by decreasing the operating frequency of the alternating electrical voltage and current to thereby increase the displacer's phase lead ahead of the pistons.

2. A method according to claim 1 wherein the Stirling cooler is connected in a refrigeration apparatus having a storage chamber and configured for lifting heat from the storage chamber, the method further comprising detecting an operating frequency at which the electric motors consume a minimum electrical input power at steady state thermal load by:
 (a) varying the frequency of the alternating electrical voltage and current across a selected frequency range;
 (b) sensing the electrical power delivered into the electric motor at a plurality of drive frequencies within the frequency range; and
 (c) driving the electric motors at an operating frequency at which the smallest sensed electrical power input to the electric motor was sensed at a steady state thermal load.

3. The method according to claim 2 and further comprising:
 (a) varying the operating frequency of the electrical voltage and current applied to the electric motor in discrete frequency increments to provide a plurality of sampled frequencies across the selected frequency range;
 (b) sensing samples of electrical power input to the electric motor at each sampled frequency; and
 (c) storing the operating frequency of the smallest sensed electrical power input to the electric motor.

4. The method according to claim 3 wherein the selected frequency range is less than ±2 Hz around a mechanical nominal frequency of the gamma free piston Stirling cooler and the discrete increments are less than 0.2 Hz.

5. The method according to claim 4 wherein the selected frequency range is no greater than ±1 Hz around the mechanical nominal frequency of the gamma free piston Stirling cooler and the discrete increments are in the range of 0.05 Hz to 0.10 Hz.

6. The method according to claim 4 wherein the sensing of the electrical power delivered into the electric motor to obtain the samples is performed at spaced time intervals between 5 seconds and 30 seconds.

7. The method according to claim 3 and further comprising maintaining a constant piston amplitude of reciprocation while detecting the frequency at which the electric motor consumes a minimum electrical input power.

8. The method according to claims 7 wherein the amplitude of reciprocation at which the piston amplitude is maintained is the most recent amplitude at which the pistons were driven.

9. The method according to claim 3 and further comprising:
 (a) periodically detecting the temperature maintenance mode by sensing the temperature in the storage chamber and computing whether the sensed temperature is above a selected temperature limit or whether a time rate of change of an increase in temperature exceeds a selected temperature change rate limit; and
 (b) if the limit is not exceeded, modulating piston amplitude to maintain the freezer temperature at a set point temperature by varying the voltage input to the electric motor to vary the thermal cooling power for maintaining the temperature of the storage chamber.

10. A method for controllably varying the thermal cooling power of a gamma free piston Stirling cooler having a displacer and at least two pistons and driven in reciprocation by linear electric motors, the motors being driven by an alternating electrical voltage and current at an operating frequency, the method comprising:
 (a) driving the linear electric motors by an alternating electrical voltage and current that has a controllably variable drive frequency; and
 (b) increasing the thermal cooling power of the Stirling cooler to operate in a recovery mode by decreasing the operating frequency of the alternating electrical voltage and current to thereby increase the displacer's phase lead ahead of the pistons; or
 (c) decreasing input electrical power to the linear electric motor to operate in a temperature maintenance mode by increasing the operating frequency of the alternating electrical voltage and current to thereby decrease the displacer's phase lead ahead of the pistons.

11. The method according to claim 10 wherein the gamma free piston Stirling cooler is connected in a refrigeration apparatus having a storage chamber and configured for lifting heat out from the storage chamber, the method further comprising detecting an operating frequency at which the Stirling cooler operates at its maximum thermal cooling power by:
 (a) varying the frequency of the alternating electrical voltage and current across a selected frequency range;
 (b) sensing the thermal cooling power delivered into the Stirling machine at a plurality of drive frequencies within the selected frequency range; and
 (c) driving the electric motor at the operating frequency of the largest sensed thermal cooling power.

12. The method according to claim 11 and further comprising:
 (a) varying the frequency of the electrical voltage and current applied to the electric motors in discrete frequency increments to provide a plurality of sampled frequencies across the selected frequency range;
 (b) sensing samples of thermal cooling power of the Stirling cooler at each sampled frequency; and
 (c) storing the operating frequency of the largest sensed thermal cooling power sample.

13. The method according to claim 12 wherein the selected frequency range is less than ±2 Hz around a mechanical nominal frequency of the gamma free piston Stirling cooler and the discrete increments are less than 0.2 Hz.

14. The method according to claim 13 wherein the selected frequency range is no greater than ±1 Hz around the mechanical nominal frequency of the gamma free piston Stirling cooler and the discrete increments are in the range of 0.05 Hz to 0.10 Hz.

15. The method according to claim 13 wherein the sensing of the thermal cooling power to obtain the samples is performed at spaced time intervals between 5 seconds and 30 seconds.

16. The method according to claim 12 and further comprising maintaining the amplitude of reciprocation of the pistons at a maximum amplitude while detecting the frequency at which the Stirling cooler operates at its maximum thermal cooling power.

17. The method according to claim 12 and further comprising:
 (a) periodically detecting the recovery mode by sensing the temperature in the storage chamber and computing whether the sensed temperature is above a selected temperature limit or whether a time rate of change of an increase in temperature exceeds a selected temperature change rate limit; and
 (b) if the limit is not exceeded, modulating piston amplitude to maintain the freezer temperature at a set point temperature by varying the voltage input to the electric motor to vary the thermal cooling power for maintaining the temperature of the storage chamber.

18. The method according to claim 12 wherein the thermal cooling power is sensed by sensing the time rate of decrease of the temperature in the storage chamber.

19. A method for controllably operating a gamma free piston Stirling cooler at times in a temperature maintenance mode and at times in a recovery mode, the Stirling cooler having a displacer and at least two pistons and driven in reciprocation by linear electric motors, the motors being driven by an alternating electrical voltage and current at an operating frequency, the method comprising:
(a) driving the linear electric motors by an alternating electrical voltage and current that has a controllably variable drive frequency;
(b) decreasing input electrical power to the linear electric motor to operate in the temperature maintenance mode by increasing the operating frequency of the alternating electrical voltage and current to thereby decrease the displacer's phase lead ahead of the pistons; OR
(c) increasing the thermal cooling power of the Stirling cooler to operate in the recovery mode by decreasing the operating frequency of the alternating electrical voltage and current to thereby increase the displacer's phase lead ahead of the pistons.

20. The method according to claim 19 wherein the gamma free piston Stirling cooler is connected in a refrigeration apparatus having a storage chamber with an access door, the Stirling cooler configured for lifting heat out from the storage chamber of the refrigeration apparatus, the method further comprising:
(a) sensing the temperature in the storage chamber or the time rate of change of the temperature in the storage chamber or that the access door was opened; and
(b) operating the Stirling cooler in the temperature maintenance mode and decreasing input electrical power to the linear electric motor by increasing the operating frequency of the alternating electrical voltage and current when at least one of the following is sensed,
(1) the sensed temperature is colder than a selected cold temperature limit; or
(2) the sensed temperature decreased at a time rate of change less than a selected time rate of change limit; OR
(c) operating the Stirling cooler in the recovery mode and increasing the thermal cooling power of the Stirling cooler by decreasing the operating frequency of the alternating electrical voltage and current when at least one of the following is sensed,
(1) the sensed temperature is warmer than a selected warm temperature limit; or
(2) the sensed temperature increased at a time rate of change beyond a selected time rate of change limit; or
(3) the access door has been opened.

21. The method according to claim 20 and further comprising:
(a) when operating in the temperature maintenance mode, modulating piston amplitude by varying the voltage input to the electric motors to vary the thermal cooling power to maintain the storage chamber temperature at a set point temperature; and
(b) when operating in the recovery mode, maintaining the piston amplitude at a maximum amplitude.

22. The method according to claim 21 for detecting optimum operating frequencies for the temperature maintenance mode and for the recovery mode, the method further comprising:
(a) detecting an operating frequency at which the electric motors consume a minimum electrical input power by:
(1) varying the frequency of the alternating electrical voltage and current across a selected frequency range;
(2) sensing the electrical power delivered into the electric motors at a plurality of drive frequencies within the frequency range; and
(3) storing the operating frequency at which the smallest sensed electrical power input to the electric motors was sensed; and
(b) detecting an operating frequency at which the Stirling cooler operates at its maximum thermal cooling power by:
(1) varying the frequency of the alternating electrical voltage and current across a selected frequency range;
(2) sensing the thermal cooling power delivered by the Stirling cooler at a plurality of drive frequencies within the selected frequency range; and
(3) storing the operating frequency of the largest sensed thermal cooling power; and
(c) when operating the Stirling cooler in the temperature maintenance mode, driving the electric motors at the operating frequency of the smallest sensed electrical power input to the electric motors; and
(d) when operating the Stirling cooler in the recovery mode, driving the electric motors at the operating frequency of the largest sensed thermal cooling power.

23. The method according to claim 22 and further comprising:
(a) varying the operating frequency of the electrical voltage and current applied to the electric motor in discrete frequency increments to provide a plurality of sampled frequencies across the selected frequency range;
(b) at times sensing samples of electrical power input to the electric motor at each sampled frequency and at times sensing samples of the thermal cooling power delivered by the Stirling cooler at each sampled frequency; and
(c) storing the operating frequency of the smallest sensed electrical power input to the electric motor and storing the operating frequency of the largest sensed thermal cooling power.

24. The method according to claim 23 wherein the selected frequency range is less than ±2 Hz around a mechanical nominal frequency of the gamma free piston Stirling cooler and the discrete increments are less than 0.2 Hz.

25. The method according to claim 24 wherein the selected frequency range is no greater than ±1 Hz around the mechanical nominal frequency of the gamma free piston Stirling cooler and the discrete increments are in the range of 0.05 Hz to 0.10 Hz.

26. The method according to claim 24 wherein the sensing of the electrical power delivered into the electric motor to obtain the samples is performed at time intervals between 5 seconds and 30 seconds.

27. The method according to claim 22 and further comprising:
  (a) maintaining a constant piston amplitude of reciprocation while detecting an operating frequency at which the electric motor consumes a minimum electrical input power; and
  (a) maintaining the amplitude of reciprocation of the pistons at a maximum amplitude while detecting an operating frequency at which the Stirling cooler operates at its maximum thermal cooling power.

28. The method according to claim 22 wherein the thermal cooling power is sensed by sensing the time rate of decrease of the temperature in the storage chamber.

29. An improved gamma free piston Stirling cooler having a displacer and at least two pistons and configured for being driven in reciprocation by linear electric motors, the motors being driven by an alternating electrical voltage and current at an operating frequency, the improvement comprising:
  a source of alternating electrical voltage and current providing power, voltage, and current and connected in a configuration for driving the electric motor, the source having a controllably variable frequency; and
  a controller configured to:
    decrease input electrical power to the electric motor to operate in a temperature maintenance mode by increasing the operating frequency of the alternating electrical voltage and current to thereby decrease the displacer's phase lead ahead of the pistons; or
    increase the thermal cooling power of the Stirling cooler to operate in a recovery mode by decreasing the operating frequency of the alternating electrical voltage and current to thereby increase the displacer's phase lead ahead of the pistons.

30. The improved gamma free piston Stirling cooler according to claim 29 and further comprising:
  (a) a freezer storage chamber to which the Stirling cooler is thermally connected and is configured for lifting heat out from the storage chamber;
  (b) an electrical power sensing circuit connected to the linear electric motor and configured to sense the electrical power input to the electric motor;
  (c) a temperature sensor thermally connected to the storage chamber and configured for sensing the temperature in the storage chamber; and
  (d) a controller connected to the temperature sensor and the electrical power sensing circuit and configured to controllably vary voltage amplitude and frequency of the alternating electrical voltage applied to the electric motor.

* * * * *